US012656266B2

(12) United States Patent
Lightfoot

(10) Patent No.: US 12,656,266 B2
(45) Date of Patent: Jun. 16, 2026

(54) METHOD AND APPARATUS FOR THE REAL TIME QUANTIFICATION OF SUBTLE VARIATIONS IN A PLANAR MATERIAL AND IDENTIFICATION OF A CORRESPONDING SOURCE OF THE IDENTIFIED SUBTLE VARIATION

(71) Applicant: Edwin J. Lightfoot, Amherst, NY (US)

(72) Inventor: Edwin J. Lightfoot, Amherst, NY (US)

(73) Assignee: Ted Lightfoot LLC, Amherst, NY (US)

( * ) Notice: Subject to any disclaimer, the term of this patent is extended or adjusted under 35 U.S.C. 154(b) by 853 days.

(21) Appl. No.: 17/967,564

(22) Filed: Oct. 17, 2022

(65) Prior Publication Data

US 2023/0122383 A1 Apr. 20, 2023

Related U.S. Application Data

(60) Provisional application No. 63/256,812, filed on Oct. 18, 2021.

(51) Int. Cl.
*G01N 21/89* (2006.01)

(52) U.S. Cl.
CPC .................................... *G01N 21/89* (2013.01)

(58) Field of Classification Search
CPC .. G01N 21/89; G01N 21/892; G01N 21/8922; G01N 2021/8909; G01N 2021/8927
See application file for complete search history.

(56) References Cited

U.S. PATENT DOCUMENTS

| | | | | |
|---|---|---|---|---|
| 3,958,127 | A | 5/1976 | Faulhaber et al. | |
| 4,982,600 | A * | 1/1991 | Kiso | G01N 21/8922 73/104 |
| 5,745,365 | A * | 4/1998 | Parker | G01N 21/8922 162/263 |
| 5,893,055 | A * | 4/1999 | Chen | G01N 21/89 700/128 |
| 6,411,860 | B1 * | 6/2002 | Chen | G06T 7/0004 162/263 |
| 9,008,975 | B2 * | 4/2015 | Koshihara | G01N 21/892 702/81 |

FOREIGN PATENT DOCUMENTS

JP H06324005 A * 11/1994

OTHER PUBLICATIONS

Machine Translation of JP H06324005 A (Year: 1994).*
(Continued)

*Primary Examiner* — Alvin H Tan
(74) *Attorney, Agent, or Firm* — Harter Secrest & Emery LLP; Brian B. Shaw; Douglas R. Smith

(57) ABSTRACT

The present disclosure provides for identifying subtle variations in a planar material and in real time associating the subtle variations with a cause. Data from gauging or optical inspection of the planar material on a manufacturing line is analyzed in real time for certain root causes of identified variations in the planar material. The data is analyzed at a predetermined longitudinal frequency, averaged and compared to an estimated effect of a known variation source to identify a residual variation. The process is iterative to identify all statistically significant causes of the subtle variations in the planar material.

20 Claims, 4 Drawing Sheets

(56) References Cited

OTHER PUBLICATIONS

Kristinsson, K. et al., (1993) "Paper machine cross directional basis weight control using Gram polynomials," 2nd IEEE Conference on Control Applications: 235-240.
Kristinsson, K., (1994) "Cross directional control of basis weight on paper machines using Gram polynomials," The University of British Columbia:1-124.
Kristinsson, K. et al., (1996) "Cross-directional Control on Paper Machines using Gram polynomials," Automatica 32(4):533-548.
"Online condition monitoring Valmet DNA Online condition monitoring," (May 2022) Valmet Forward https://www.valmet.com/automation/asset-performance-management/condition-monitoring/online/:1-18.
VanAntwerp J.G. et al., (2007) "Cross-Directional Control of Sheet and Film processes" Automatica 43: 191-211.

* cited by examiner

FIG. 1
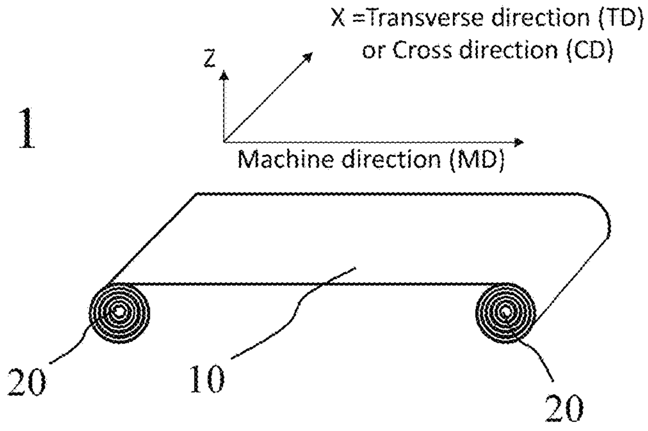
FIG. 2
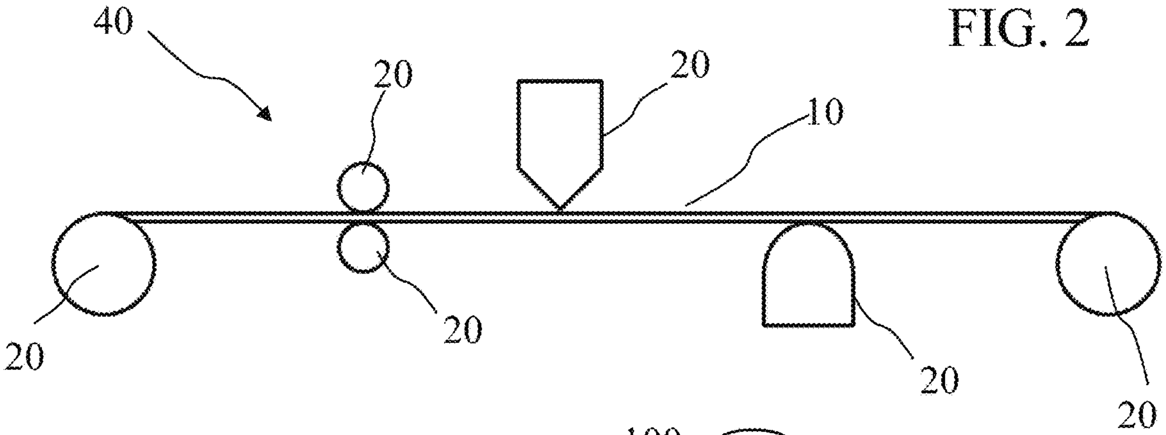
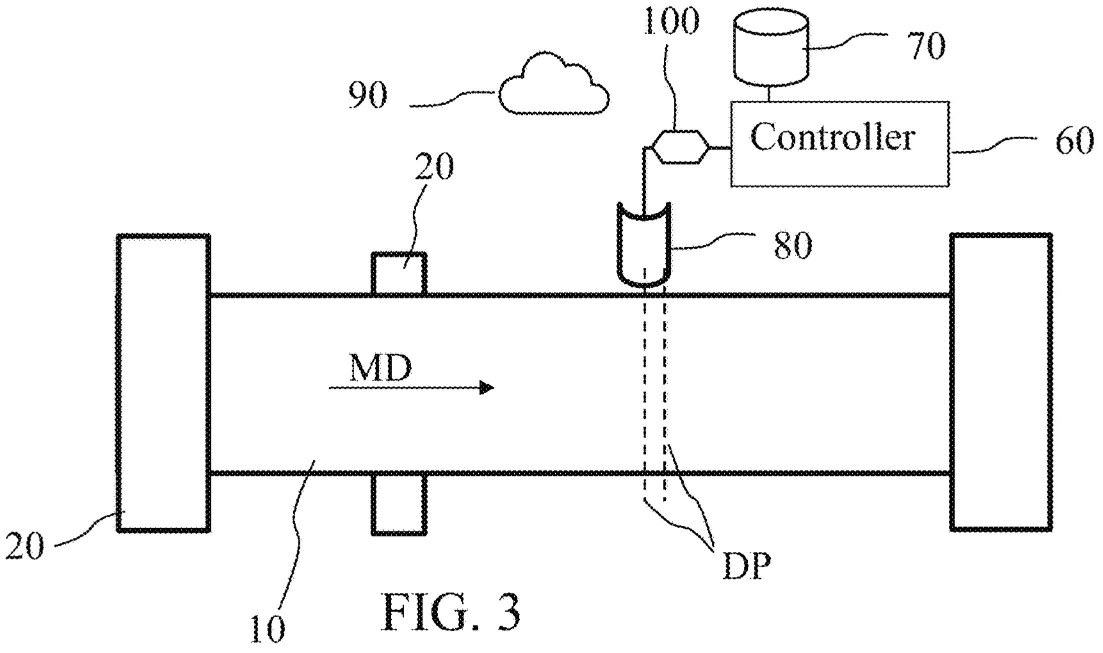
FIG. 3

FIG. 6
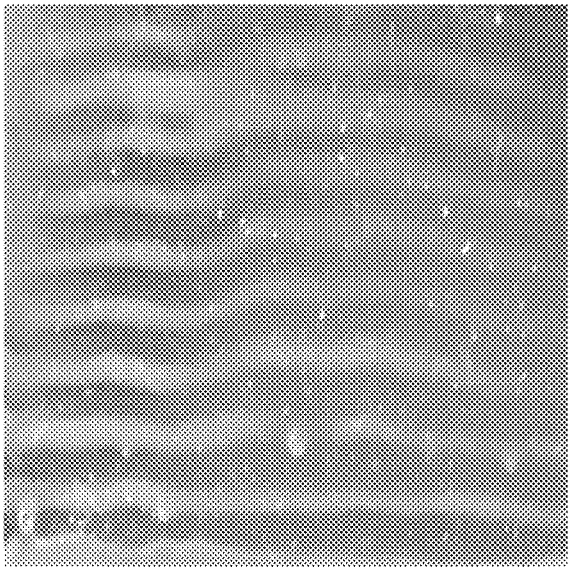
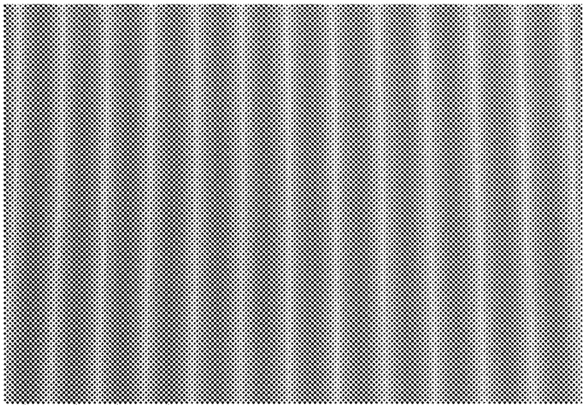
FIG. 7
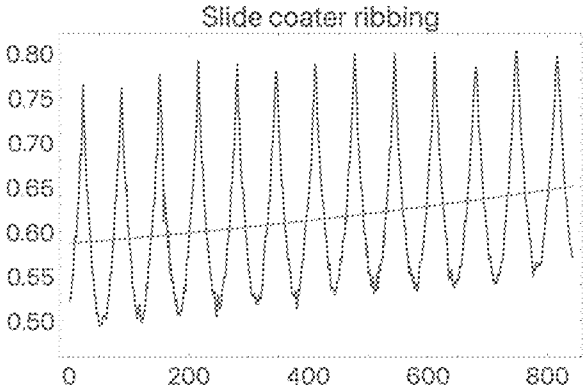
FIG. 8

METHOD AND APPARATUS FOR THE REAL TIME QUANTIFICATION OF SUBTLE VARIATIONS IN A PLANAR MATERIAL AND IDENTIFICATION OF A CORRESPONDING SOURCE OF THE IDENTIFIED SUBTLE VARIATION

CROSS-REFERENCE TO RELATED APPLICATIONS

The present application claims the benefit of U.S. provisional patent application 63/256,812 filed Oct. 18, 2021 entitled ANALYSIS, DIAGNOSIS, AND OPTIMIZATION OF SPATIAL VARIATIONS IN PLANAR MATERIAL PROCESSING, the entire disclosure of which is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present disclosure is related to a system for manufacturing a planar material and more particularly to a system for using gauging and optical inspection to analyze a planar material in real time on a manufacturing line for identifying certain root causes of the identified subtle variations in the planar material.

Description of Related Art

Moving webs of material such as films, paper, metals and textiles are extremely difficult to inspect with the naked eye. In many manufacturing lines, the web is moving at a rate which is too fast for a human to efficiently and accurately analyze or inspect. However, it is advantageous to inspect the entire web for faults or features since faults or features may occur at any location along the web. Faults or features include holes, spots, dirt, streaks, dents (three dimensional defects), coating and formation problems some of which may be as small as twenty five microns in size. Existing web inspection systems may employ continuous imaging which may be inspected at a later time.

However, the need exists for the real time identification of subtle variations and the association of a root cause for the subtle variation during the manufacture of planar material, such as but not limited to webs.

BRIEF SUMMARY OF THE INVENTION

In one configuration, the present disclosure provides a method for diagnosing a source of subtle variations in a property of a planar material moving in a machine direction along a manufacturing line having a plurality of machine components, at least a subset of the plurality of machine components having a known corresponding periodic frequency [or period], the planar material having a longitudinal direction extending along the machine direction and transverse direction perpendicular to the longitudinal direction, the method including (a) obtaining from a sensor a dataset, the dataset comprising values of the property in an array of points extending along the machine direction and the transverse direction of the planar material, wherein the points taken along the transverse direction are at a series of longitudinal locations on the planar material, and wherein a distance between subsequent longitudinal locations is less than one half a travel distance of the planar material in one cycle of a highest frequency machine component; (b) statistically decomposing measured variations in the dataset into a linear sum of components attributable to at least one of a predetermined mechanical cause and predetermined fluid mechanical cause: wherein variations having no change in the machine direction are taken as a standing transverse direction variation and are estimated by taking an average of a multitude of transverse arrays along the machine direction, wherein the standing transverse direction variation is decomposed into one of (i) a variation that is periodic in the transverse direction and (ii) a non-periodic variation in the transverse direction, [wherein the non-periodic variation in the transverse direction is attributed to an imperfections in the machine components and the periodic variation in the transverse direction is attributed to at least one of a fluid mechanical, a solid mechanical, a plastic, or a viscoelastic instability in the planar material, or the feed stock to the process; wherein oscillatory variations in the machine direction are decomposed into one of (i) periodic variations corresponding to a known frequency of the machine components and (ii) non-periodic variations independent of the known corresponding periodic frequency mechanical frequencies; wherein the non-periodic variations independent of the known corresponding periodic frequency mechanical frequencies are decomposed into one of (i) variations corresponding to a measured oscillatory variation and (ii) variations attributed to the fluid mechanical, the solid mechanical, the plastic, or the viscoelastic instability in the planar material; wherein non-oscillatory variations in the machine direction are attributed to a long term aperiodic variations in one of a feed material and a processing conditions on the manufacturing line; wherein oscillatory variations in the machine direction corresponding to the known corresponding periodic frequency mechanical frequencies are assessed to determine a nature of a mechanical defect; and (c) identifying a periodic length on the planar material corresponding to a period of each of the plurality of machine components and estimating, for each machine component frequency, an average variation at each point in the transverse direction along a series of longitudinal locations occurring during movement of the planar material in the machine direction during one cycle (or period) of the machine component to create a two dimensional array of the variation at the machine component frequency and diagnosing the imperfections in the machine component corresponding to the machine component frequency, wherein subtle variations repeating at a known component frequency are decomposed into one of (i) variations manifesting as straight lines parallel to the transverse direction and are attributed to the machine components that exhibit the frequency of the variation; (ii) subtle variations manifesting as straight lines at an angle to the transverse direction and are attributed to the machine components that exhibit variations at that frequency combined with asymmetry of the line; and (iii) subtle variations manifesting as curved lines and are attributed to the machine component that exhibits that frequency combined with a fluid mechanical, a solid mechanical, a plastic, or a viscoelastic effects in the planar material.

The present disclosure includes a further method for diagnosing subtle variations in a planar material moving in a machine direction along a manufacturing line having a plurality of machine components, each machine component having a corresponding revolution frequency [or period], the planar material having a longitudinal direction extending along the machine direction and transverse direction perpendicular to the longitudinal direction, the method including obtaining a dataset including a first subset of transversely spaced data points from the planar material taken along the transverse direction at a first longitudinal location on the planar material and a second subset of transversely spaced data points taken along the transverse direction at a second longitudinal location on the planar material, wherein a distance between the first longitudinal location and the second longitudinal location is less than one half a travel distance of the planar material in one cycle of a highest frequency machine component; identifying a periodic length on the planar material corresponding to each of the plurality of machine components; estimating, for each machine component, an average variation at each point in the transverse direction along a series of longitudinal locations occurring during movement of the planar material in the machine direction during one cycle [period] of the machine component; comparing the estimated average variation for least one machine component to a corresponding variation in the dataset to obtain a residual variation; and fitting an additional frequency (period) to the residual variation to identify a source of the residual variation.

The present disclosure also provides an apparatus for diagnosing subtle variations in a planar material moving in a machine direction along a manufacturing line having a plurality of machine components, each machine component having a corresponding revolution frequency [or period], the planar material having a longitudinal axis extending along the machine direction and transverse axis perpendicular to the longitudinal axis, the apparatus including a dataset, the dataset having a first subset of transversely spaced data points (which can be taken as corresponding signals) from the planar material taken along the transverse direction at a first longitudinal location on the planar material and a second subset of transversely spaced data points taken along the transverse direction at a second longitudinal location on the planar material, wherein a distance between the first longitudinal location and the second longitudinal location is less than one half a travel distance the planar material in an amount of time of a highest frequency machine component to complete one revolution; and a controller configured to analyze the dataset, the controller configured to (i) identify a periodic length on the planar material corresponding to each of the plurality of machine components; (ii) estimate, for each machine component, an average variation at each point in the transverse direction along a series of longitudinal locations occurring during movement of the planar material in the machine direction during one cycle [period] of the machine component, (iii) compare the estimated average variation for least one machine component to a corresponding variation in the dataset to obtain a residual variation; and (iv) fit an additional frequency (period) to the residual variation to identify a source of the residual variation.

The present disclosure further provides a method of manufacturing a web within a nominal operating window, the web passing longitudinally along a machine direction and having a transverse direction transverse to the machine direction, the method including measuring a spatial variation in a property of the web along the transverse direction of the web at a first longitudinal location on the web and a second longitudinal location on the web; decomposing the measured spatial variation into an assignable component and a noise component; identifying, from a first predetermined value, a first cause corresponding to a first portion of the assignable component to generate a residual component; and decomposing the residual component to identify, from a second predetermined value, a second cause corresponding to a portion of the residual component.

BRIEF DESCRIPTION OF THE SEVERAL VIEWS OF THE DRAWING(S)

FIG. 1 is a schematic of planar material between a supply roll and a take-up roll.

FIG. 2 is a schematic of a manufacturing line having a plurality of machine components.

FIG. 3 is a schematic of a manufacturing line showing the transverse data collection in the machine direction as limited by a machine component cycle.

FIG. 6 is a gray scale image of a periodic defect (barring) that produces transverse direction lines that are neither straight nor uniformly perpendicular to the machine direction, shown as vertical in FIG. 6, and can be attributed to a hydrodynamic effect triggered by mechanical vibrations in the manufacturing line.

FIG. 7 is a gray scale image of a ribbing defect that runs in the machine direction (shown as vertical)

FIG. 8 is a plot of an array of gray scale values versus an array index taken in the transverse direction from the center of the image of FIG. 7, and wherein FIG. 8 shows a second order Gram polynomial baseline correction.

DETAILED DESCRIPTION OF THE INVENTION

Figure 4:
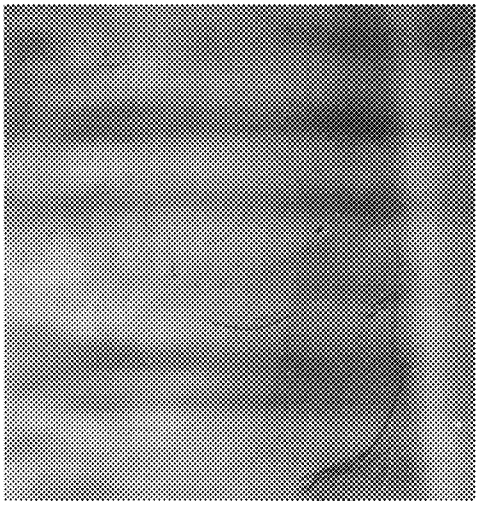
FIG. 4 is a gray scale image of a periodic defect (chatter) that is perpendicular to the machine direction, shown as vertical in FIG. 4.

Referring to FIGS. 1 and 2, the present disclosure relates to a real time diagnostic algorithm for quantifying the variability introduced in a planar material 10 caused by imperfections in machine components 20 of a manufacturing line 40 used to create the planar material and any planar materials that are used as raw materials for the planar material being manufactured. The present disclosure provides for diagnosing the contributions to variability that arise from rotating machinery in the manufacturing line 40. The present disclosure can further distinguish fluid mechanical effects from mechanical effects, and provide a means to monitor changes in these effects that may be used to determine a corrective action in the manufacturing line 40 likely to mitigate the subtle variations.

As used herein, the planar material 10 may be comprised of a single layer of material or a plurality of layers that may be created in a single pass through a manufacturing process, multiple passes through a manufacturing process, or multiple passes through a plurality of manufacturing processes. Examples of the planar material 10, include but are not limited to, casting of a monolayer film, casting a multilayer film by coextrusion or other means, coating a previously formed planar material sequentially, simultaneous multilayer coating of previously formed planar material, and lamination of multiple planar materials. While some planar materials 10 can be wound into rolls as shown in FIG. 1, it is understood the planar material may be created without a roll based substrate and may be cut into pieces prior to or in lieu of being wound into rolls. Planar materials 10 may also be created in a circular cross section that is later slit into a planar form (including, but not limited to, tubular blown film that passes through a collapsing frame to create a planar object suitable for winding). Further examples of planar material 10 includes but is not limited to paper and cardboard, such as manufactured on a Fourdrinier machine; coated paper, calendared paper, plastic film and sheet, extruded film, solvent cast film, reactive cast film or sheet, coated film, calendared plastic or elastomeric film, blown film and bags, nonwoven fabrics and papers, woven and knitted fabrics, metal foils, coils, strips, and sheets, as well as glass sheets and rolls, and laminates of any combination of the above.

Variations can be characterized by a magnitude or severity of the variation. For purposes of this description, variations include defects, flaws, and subtle variation. Specifically, defects are sufficiently severe variations that they render the planar material 10 unfit for its intended use. Flaws are less severe variations than defects and can often be detectable by eye or instrumentation as a discrete feature of the variation. Subtle variations are of sufficiently reduced magnitude that in a single measurement, the subtle variation may or may not be distinguishable from a noise level.

Generally, the manufacturing of the planar materials 10 defines an operating window bounded by the appearance of gross defects, safety, or operating or process limits. Examples of process limits include, but are not limited to, extrusion processes as limited by melt fracture, solvent coating lines limited by explosion hazards in drying ovens, and speed limitations on drive systems. The operating window defines inoperable ranges of operating parameters and conditions that bound the window: the operating window itself is defined by eliminating the inoperable ranges from the space of all possible operating parameters.

However, while operating inside the window is safe, feasible, and does not produce gross defects, the quality of the material produced may vary from point to point within the operating window. Examples of this include but are not limited to: physical properties (e.g., degree of crosslinking) that are functions of operating conditions and variations in thickness of one or more layers that may arise from incipient fluid mechanical instabilities, variations due to mechanical effects that appear under certain conditions, approaching or avoiding mechanical resonance, conditions that minimize or maximize thermoelastic deformations of equipment, and conditions that minimize or maximize the effects of imperfections in machining, equipment design, and equipment wear.

In describing spatial variations in the planar material 10, a thickness of the planar material is sometimes referred to as gauge, gage, profile, caliper, or grammage control. It is understood that a "standing transverse direction gauge" representing the average transverse direction gauge profile over a time scale significantly greater than the time scale over which control actuators respond can be factored out. For active control, the transverse direction component may be broken into controllable and noncontrollable components.

Generally, the present disclosure breaks the spatial variation into components that represent a plurality of possible physical sources of the variation that are evaluated iteratively, wherein the standing component to the transverse direction variation is separated out. In most, but not all, cases, the time scale over which the standing transverse direction variation is estimated in this disclosures is much shorter than the time scale used to estimate the standing transverse direction gauge in active thickness control systems. Although transverse direction thickness control is a common active control system, there are instances in which other process variables are used to control properties other than thickness including but not limited to moisture control and planarity of the planar material 10. Thus, what is called standing variation in the context of this disclosure may contain components that can be eliminated by the control system as well as components that are uncontrollable.

Planar materials can exhibit variation in thickness and other properties. Table 1 gives examples of common subtle variation patterns their root causes, subcategories of causes, their statistical fingerprint and preferred statistical analysis, and characteristic frequency.

TABLE 1

| Potential cause | Subcategory | Statistical fingerprint | Frequency |
|---|---|---|---|
| Roller defects | Runout | Sinusoidal variation if the roller is nearly circular in cross section or the defect results in the shaft being off axis. Start with Fourier analysis.<br>See flat spots/seam marks below | Roll rotation frequency. |

TABLE 1-continued

| Potential cause | Subcategory | Statistical fingerprint | Frequency |
|---|---|---|---|
| | Taper | Slope in the standing transverse direction variation. | For pure taper (conical cross section roller) there is no frequency dependence. See comments on noncircular cross section under "runout" |
| | Misalignment | Sinusoidal variations in the slope of the transverse direction profile. Start with Fourier analysis. | Roll rotation frequency; however, if the misalignment is complex frequency doubling is possible. |
| | Flat spot or seam lines on roller | Wavelet analysis. | Roll circumference divided by roll surface speed (line speed) |
| Drive system | Bearings | More likely to generate sharp spikes in the torque applied by the bearing that are more amenable to wavelets than sine waves. However, the high inertia of rollers and the material being processed act as a filter turning the variations into smoother signal amenable to Fourier analysis. | Frequencies of ball pass on the outer race, ball pass on the inner race, ball (or rolling element) spin factor, and the fundamental train frequency per shaft revolution are available from bearing manufacturer. |
| | Universal joints | Sinusoidal - likely to show up in Fourier analysis | Twice the frequency at which the roller turns |
| | Constant Velocity joints | Sinusoidal or wavelet for badly worn | Joint rotation frequency |
| | Gears | Wavelet analysis | Tooth rotation frequency along with key rotation frequency |
| | Timing belts | Wavelet analysis, Coiflet and Battle LeMarie wavelets seem to fit best. | Tooth frequency |
| Hydrodynamic oscillatory flow (including but not limited to barring flow in coating, air ring chatter in tubular extrusion) | | Wavelet transform, Daubechies fit best. The pattern is better represented using a two dimensional wavelet analysis | May or may not be locked to mechanical frequencies (e.g., vibrations), |
| Sensitivity to ribbing and barring flows and uniform streaks | Hydrodynamic sensitivity | Wavelet analysis, Daubechies wavelets seem to fit best | Attributed to hydrodynamics but tied to the machine components |

Many variations exhibit distinctive patterns that cover the full planar material 10, other defects appear as linear disturbances, some appear as discrete spots, and yet other variations have distinctive shapes that do not fit these categories (a specific example being insects that become embedded is sheets). Variations may comprise variations in thickness of one or more layers in the planar material 10, surface disturbances that do not comprise a significant thickness variation, inclusions, voids, variations in properties, and nonplanarities (i.e., the planar material is of substantially uniform thickness but is deformed in such a way that it is no longer flat). Variations, and their patterns, may repeat at regular intervals or nearly regular intervals, they may occur at random, be isolated to one or more lane of the planar material 10, cover the whole planar material or primarily one side of the planar material, or exhibit other topological distributions. Variations may or may not involve variations in composition—including but not limited to variations resulting from nonuniform distribution of the intended raw materials, contaminants, non-uniform distribution of reaction products in the planar material 10, residual solvent level, or voids. In many cases planar materials 10 are cast on a substrate or carrier and may be protected by a coversheet. Variations on both substrate and coversheet can contribute to variations in the planar material 10. Variations in the planar material 10 may be manifested at the top surface (air or coversheet interface), the bottom interface (with air or the substrate), in one or more individual layers in the planar material 10 or in all layers of the planar material. The variations may be oriented in the machine direction (MD), the transverse direction (TD) that in some industries is also called the cross direction, they may be oriented in an oblique direction, the orientations may be variable, or they may have no orientation.

With respect to noise, it is recognized that measurement noise can have many components. For example, all resistors (and thus virtually all electrical circuits) exhibit Johnson noise (sometimes called thermal noise). In addition, most electrical systems exhibit a noise signal at the frequency of alternating current power used in power transmission (i.e., 60 Hz or 50 Hz). Many measurements on manufacturing lines 40 for planar materials 10 exhibit noise induced by vibrations of the manufacturing line. These effects of these variations often characterized in terms of frequency less than one per centimeter; however, the waveforms may not be sinusoidal and the signal may have some components at much high frequency.

The manufacturing line 40 can include a plurality of the machine components 20, a controller 60, and a sensor 80. The controller 60 can be a dedicated processor or computer as programmed with the present algorithm, and include a memory 70 or access a memory of the datasets. The machine components 20 can include but are not limited to, rollers, idle rollers, drive rollers, take up rollers, supply rollers, baths, treating stations, drive mechanisms (drives), pumps, extruders, winders, buffers. Each of the machine components 20 can contribute a periodic disturbance or signature. For example, each roller on the manufacturing line may have an associated frequency or period, each pump or extruder may have an associated rotational frequency, the drives on the manufacturing line 40 can exhibit periodic disturbances that may result in irregularities of the planar components that compromise the planar material 10 being manufactured.

In one configuration, the frequencies or periods for each machine component 20 should be identified. That is, the frequencies or periods for each machine component 20 that are known to exist in the planar material 10 should also be obtained. For example, in a given machine component 20, that rotates on bearings, there may be frequencies corresponding to the ball pass on the outer race, the ball pass on the inner race, the ball (or rolling element) spin factor, and the fundamental train frequency. In addition, the rotating component may introduce subtle variations due to imperfections in the machine component 20 itself. For spatial analysis, each frequency described above is converted to a periodic length on the planar material corresponding to each rotational mode. The subtle variations over this periodic length represent the contribution of all components known to exhibit this frequency. Examination of the subtle variations over this periodic may or may not prove uniquely diagnostic of the source of the variation. For example, if the variations are caused by imperfections in the manufacture of a given roller 20 that is unique in exhibiting the periodic length, the effect of these imperfections are uniquely linked to the given roller. If the periodic length corresponds to a plurality of rollers 20 operating with the same periodic length, the subtle variations at that periodic length may be caused by imperfections in one roller or by resonance between the plurality of rollers; thus, the variation may be attributable to a set of rollers rather than a specific roller.

The present disclosure provides a system and method for the diagnosis of subtle variations in the thickness or other properties of the planar material 10 based on analyzing a series of data taken at a number of points DP across the planar material at points that correspond to a regular spacing in the machine direction not to exceed ten centimeters. As seen in the schematic, the sensor 80 can be used to obtain the data points DP. The sensor 80 can be any of a variety of sensors, such as but not limited to, optical inspection systems operating in reflection or transmission mode, arrays of single point thickness gauges such as beta absorption gauges, gamma backscatter gauges, IR thickness gauges, IR moisture gauges, or capacitance gauges.

In one configuration, the machine direction spacing of the data points DP is less than one half the distance the planar material 10 travels in the amount of time it takes a machine component 20, other than a bearing, to complete one revolution. In a further configuration, the machine direction spacing of the data points DP is less than one tenth the distance the planar material 10 travels in the amount of time it takes the machine component 20, other than a bearing, to complete one revolution. In a further configuration, the machine direction spacing of the data points DP is less the distance the planar material 10 travels in the amount of time it takes the bearing rotating at the highest frequency of the bearings on the manufacturing line 40 to complete one revolution. In a further configuration, the machine direction spacing of the data points DP is less than one quarter the distance the planar material 10 travels in the amount of time it takes the bearing rotating at the highest frequency of the bearings on the line to complete one revolution. The spacing of the data points DP in the direction transverse to the machine direction (sometimes called the cross or transverse direction) may be greater than the machine direction spacing; however, the spacing of the data points in the transverse should produce greater than ten data points in the transverse direction. In one configuration the spacing of the data points DP in the direction transverse to the machine direction should produce at least twenty data points in the transverse direction. In a further configuration, the spacing of the data points in the direction transverse to the machine direction does not exceed one millimeter. This sequence of machine direction data arrays can be stored in its entirety in the controller 60 or the memory 70 (or off site in a cloud storage 90) or may be stored in a buffer 100. The transverse direction array of data points stored at each machine direction location may be stored in its entirety in the controller 60, the memory 70, the buffer 100, or the cloud 90. However, in one configuration the amount of stored data can be reduced or minimize by fitting the data using standard statistical models or through the use of orthogonal polynomials. In one configuration, the orthogonal polynomials used to fit the transverse direction data at each machine direction point in the array are Gram polynomials.

The diagnostic analysis may be performed in the frequency or the spatial domain. However, for purposes of description, the diagnostic analysis is set in terms of the spatial domain. The analysis is aided by having a table listing the frequency or period of rotation of each machine component 20 of the manufacturing line 40. For bearings, the ball pass on the outer race, the ball pass on the inner race, the ball (or rolling element) spin factor, and the fundamental train frequency are typically provided by the bearing manufacturer as a frequency per shaft revolution. For rollers, the shaft rotation frequency is equal the surface speed of the roller divided by the circumference of the roller. The surface speed of the roller may be measured with a tachometer or estimated (assuming no slip) as equal to the line speed at that point in the manufacturing line 40. For rotating equipment such as pumps and extruders, the periodic length is the line speed at the sensor divided by the rotational frequency of the machine component 20. On some manufacturing lines 40 for processing planar materials 10, the line speed is constant throughout the manufacturing line. On other manufacturing lines 40 for processing planar materials 10, the planar material is stretched or heat relaxed and the line speed varies from one section of the line to the next. Thus, it is advantageous to express the table of frequencies as a function of manufacturing line speed at each point in the manufacturing line 40. In one configuration, the table of known frequencies is tied to the controller 60 for the manufacturing line and the frequencies of each piece of rotating machinery are updated as processing conditions change. In another configuration, the table of known frequencies can be updated to account for changes in rotational speed by operator input. In many situations the design of the bearings is unknown; in this case, the present system treats the effects of the bearings as variations at unknown frequencies.

Not all known frequencies correspond to rotating equipment: known frequencies not associated with rotating equipment include but are not limited to building vibrations, resonant frequencies span vibrations, and the frequency of alternating current electrical transmission (typically 60 Hz or 50 Hz).

If all of the known frequencies and periods of variation are known for all the machine components 20 of the manufacturing line 40, the analysis proceeds most simply by estimating the average signal at each point across the transverse direction for a series of machine direction points that represents one period of each known frequency. An illustrative, but not limiting, example is if a roller 20 has a circumference of one meter, the earliest transverse array or array of fitting coefficients is averaged with the transverse data taken one meter later and this is repeated every meter in the stored data or a section of the stored data that is sufficient to produce a statistically significant average of the data. If the spacing of the data array is not an exact match for the period of roller, the transverse direction profile can be estimated by interpolation of the measured array. This calculation is then repeated for each successive scan of the sensor 80 until a set of average scans is obtained for each point about the rotation of the roller. This sequence of transverse direction profiles (averaged at one frequency or period) produces a map of the subtle variations produced by the corresponding roller. In the case of a roller, the map may represent the out of roundness of the roller. Similarly, the average subtle variation produced by each source of periodic variation can be mapped and analyzed to diagnose the mechanism of the subtle variation.

Once the analysis of the known sources of subtle variation has been performed (or the table has been provided), the total variations of the obtained data set from the scans (above) is compared to the variation attributable to the analysis of the known modes from the known machine components of the table as described above. There is also a variation known as the standing variation that corresponds to the time average of all data. Assuming the effects are describable by linear superposition, the residual variation after accounting for sources one to k is given by:

$$\psi_r(x, t \mid k) = \left(\psi(x, t) - \psi^0(x, t)\right) - \psi_{Standing}(x) - \sum_{j=1}^{k} \psi_i\overline{(x, t)}$$

where ψ^0 (x,t) is the target value of y at a point corresponding to position x and an MD position that will be measured at time t.

The first two terms (in parentheses) on the right hand side of the equation, $\psi(x,t)-\psi^0(x,t)$, represent the deviation from the desired property. If the manufacturing line is to produce a material of uniform properties, this is a constant. However, if the manufacturing line is to produce a specific pattern (such as, but not limited to, a patch coating, a gradient band, or a printed image), the difference of these first two terms represents the deviation from the ideal pattern. The advantage of employing the table of the known sources of variation is that the initial analysis need not be performed at all frequencies or periods. However, if the effects of the known sources of leave a large residual, $\psi_r(x,t|k)$, additional frequencies or periods can be fit to determine the frequency or period of an unknown sources of variation using standard time series analysis. It is recognized that subtle variations from sources not related to the manufacturing line may include, but not be limited to, hydrodynamic instabilities, or limit cycles, or subtle variations in raw materials used in the process including but not limited to the planar substrate sometimes called a base or web on which coatings are applied.

In one configuration, the iteration is repeated until the residual variation is reduced to having the same variance as the true noise of the sensor. However, in practice the unassignable residual noise can be somewhat larger than the noise of the sensor, since not all physical effects will produce signals large enough to be estimated reliably given the noise and to reflect the error in the linearized model given above. However, the known statistical analysis of variance can be used to determine which estimated subtle variations are statistically significant.

The maps corresponding to each period or frequency may be analyzed using known image processing techniques (e.g., wavelet analysis) to look for patterns such as transverse lines. The transverse lines run perpendicular to the machine direction or the transverse lines may be at an angle to the machine direction that is caused by numerous factors such as tension gradients across the film, a lag as the effect of a defect in the manufacturing line 40 on one side of the line propagates across the planar material 10. These can be used to diagnose the specific source of the defect (e.g., which side of the line has a defective bearing). Standard image analysis techniques can also be used to differentiate straight lines including but not limited to those caused by chatter from curved or wavy lines such as barring that are more commonly associated with hydrodynamic instabilities. These three classes of lines are illustrated in Example 1 below.

Standard Fast Fourier Transform (FFT) analysis of machine direction variations can be used to separate machine direction variations into harmonic components. However, the analysis of the maps of the effect of mechanical imperfections with wavelet analysis can produce a more compact representation of the effect since FFT analysis requires a large number of terms to fit sharp features (such as may be caused my many factors including but not limited to a surface defect on a bearing).

That is, in one configuration, the present algorithm for diagnosing the sources of unwanted spatial variation in any property (including but not limited to thickness) of the planar material includes the steps of: (1) obtaining an array of readings; (2) analyzing of the dataset; (3) relating the structures of the preferred models to the sources; and (4) characterizing in order.

Step 1 includes obtaining a dataset of an array of readings of the property at discrete positions $x_i$ and times $t_j$ (corresponding to machine direction positions) that extends over a time frame that is large compared to the expected duration of the physical causes that may be considered. These reading are set forth as the raw signal. However, it is recognized the raw signal can be subject to known signal processing to compensate for known effects in the measurement system.

Step 2 includes the following five elements, as set forth in detail below, may be performed in various orders depending on the defect. The five elements include (i) optionally generating an array of errors; (ii) estimating the standing transverse direction signal; (iii) fitting the readings or errors at each time $t_j$; (iv) iteratively generating a series of statistical models; and (v) analyzing the time dependence of the array.

The element of optionally generating an array of errors includes generating an array of errors equal to $\psi(x,t)-\psi^0(x, t)$. For properties that are desired to be constant, the algorithm works equally well with or without converting the raw signal to an error signal. For properties that are desired to exhibit a pattern, the raw signal is converted to an error signal which may or may not be subjected to any known denoising or filtering algorithms used in signal and image processing.

The element of estimating the standing transverse direction signal, includes estimating the standing transverse direction signal $\omega_{standing}(x)$ This may be done by any mathematical procedure that is equivalent to producing the time average of the raw signal or error signal across the X (transverse) direction or by extracting a filtered standing transverse direction signal. The standing transverse direction variation is attributed to factors that produce deviations that are effectively time invariant over the time scale of the array being processed. This standing signal would typically include both the controllable and noncontrollable components of standing variation defined in dynamic thickness control algorithms if dynamic control actuators are employed.

The element of fitting the readings includes fitting the readings or errors at each time $t_{\_j}$ using orthogonal functions including but not limited to orthogonal polynomials. In one configuration, Gram polynomials are employed. In a further configuration, the statistical estimation is confined to an order that represents physical mechanisms rather than basing the order on the usual analysis of variance (i.e., the sum of squares for a term in the fit that exceeds the noise level). It is understood that the order of approximation that represents the standing variation may be different than the order used for analyzing dynamic data. This is illustrated in Example 2 and counter Example 1.

The element of iteratively generating a series of statistical model includes iteratively generating a series of statistical models for potential physical effects $\widehat{\psi_j(x,t)}$. The statistical significance of the models is determined by known statistical techniques. However, the above referenced confining the order of the baseline estimation and as statistical models for different physical effects may be correlated (i.e., one could propose multiple hypotheses to describe a feature of the spatial map and to be viable both models would need to be able to reproduce the observed pattern), the diagnostic ranking of different effects is determined by the principle of parsimony, in that statistical models that explain the greatest amount of the variation with the fewest adjustable parameters are preferred and the effects associated with those models prioritized as likely root causes.

The element of analyzing the time dependence of the array includes analyzing the time dependence of the array and/or the error signal by either Fourier analysis or wavelet analysis (including two dimensional wavelet analysis). The analysis may be performed on the data array or on the fitting coefficients of the procedure described above.

Step 3 includes the step of attributing the statistically significant effects to the sources of variation listed in Table 1 to give estimates of how much variation comes from each source with the sources prioritized by likeliness.

Step 4 is the final step of characterizing the order is employed if multiple layers are to combined by a process including but not limited to coating; the spatial variation of the base thickness (or other property) is characterized before the two layers are combined and the assignable variations in the base are subtracted from the raw signal for the multilayer planar material before the variation of the remaining layers is analyzed.

Specifically, in one configuration, the present method includes the following steps:

Step 1. Obtaining an array of data $\psi(x,t)$ that has been preprocessed as needed, such as known signal processing to give a property being fit.

Step 2. For multilayer planar materials 10, in one configuration, the property is additive between the layers of the planar material including but not limited to thickness, unit weight, and optical density. Further, for multilayer planar material 10, it is advantageous to characterize each layer that can be separated by many means including but not limited to (i) previous characterization of any layers that can be isolated for characterization including but not limited to coating substrates and face stocks for lamination and (ii) layers that can be separated by analysis of the signal including but not limited to estimating the thickness of various layers by optical interference or color separation (which is not additive between the layers).

Step 3. If the property under consideration is desired to exhibit a pattern, subtract the target signal from the raw signal to get a raw error signal $\psi(x,t)-\psi^0(x,t)$.

Step 4. For multilayer planar materials the contributions of layers characterized in Step 2 are subtracted to obtain the residual variation, given by $$\left(\psi(x,t)-\psi^0(x,t)\right)-\psi_{Standing}^{Previously\ characterized\ layers}-\sum_{j=1}^{k^{Previous\ layers}}\widehat{\psi_j(x,t)}$$

For each effect found in the previously characterized layers: (a) the spatial variations in the previously characterized layers is corrected for phase and or shifted to align the variations in the previously characterized layer to the current array; (b) the spatial variations in the previously characterized layers may require correction for stretching since many processes (including but not limited to drying processes) can stretch the substrate (for high temperature drying this is commonly up to 10%), and (c) if the property being measured is not additive or may depend on the processing history (such as, but not limited to, variations in residual solvent), the effect of the previous layers in the multilayer product must be determined by statistical analysis using the basis functions (i.e., shape) characteristic of the variation in the previously characterized layer. An illustrative but not limiting example would be a coating substrate that exhibits a sinusoidal variation in yellowness index at a base frequency plus higher harmonic frequencies with an amplitude that shows a linear dependence on the transverse direction coordinate to which a single translucent, colored, coating is applied. The analysis of the color of the final product should exhibit periodic variations in the first Gram polynomial coefficient the matching the base frequency plus the higher harmonic frequencies found in the substrate analysis. The residual gauge corrected for this factor is estimated by subtracting from the first order Gram polynomial signal, those components that match the frequency spectrum of the substrate variation.

Step 5. Obtain a long term standing pattern by averaging data over a period of time that is long compared to the known dynamics of the process and subtract this from the residual variation by averaging of the raw error signal.

Step 6. Fit each transverse direction trace of the properties using Gram polynomials of an order that represents the known physical factors that can be expected and are characterized as the standing variation. For many processes, this will be a low order Gram polynomial (cubic polynomials can fit "taper" and deflections that approximate beam theory), such as for processes with active control elements the order can approach the number of transverse direction control elements, and for processes that rely on mechanical tolerances to control the property (including but not limited to fitting the noncylindrical shape of process rollers used to control thickness).

Step 7. Perform Fourier and wavelet analysis of the Gram polynomial coefficients to estimate the machine direction variations in the property caused by the drive system components 20: (a) estimate the effects found at the known frequencies of the process including but not limited to (i) the rotational frequencies of all rotating equipment 20, (ii) the bearing pass and bearing spin frequencies for all bearings, and (iii) the frequencies of all drive system components including controllers, where standard techniques such as windowing for Fast Fourier Transforms (FFT) may be used to eliminate mathematical artifacts from the analysis; (b) compare the scaling factor found in the wavelet analysis to the periods for all known electrical and mechanical sources of the process (defined as in step 7a); (c) determine whether Fourier or Wavelet analysis gives a simpler fit of the data; (d) "de-noising" filters may be used for the wavelet and Fourier analysis to minimize the effects of measurement noise. An illustrative but not limiting example would be the use of de-noising filters for wavelet analysis that involve thresholding based on the signal noise. In one configuration, the signal noise is taken as the pure measurement noise rather than an estimate based on the unassigned residual variation so that the filter will be less likely to contaminate the estimation of the as yet unresolved effects in a manner analogous to the effects of overfitting illustrated in Example 2 and comparative Example 1, (e) estimate the sum of squares of each mode estimated above, and (f) subtract the machine direction variation found in the steps 7a to 7c from the residual variation from step 6.

Step 8. For any frequencies or periods found in the data that match sources determine if the variation is primarily in the zeroth order Gram polynomial coefficient along with even order coefficients to determine of the variation is constant across the web or primarily in the odd order coefficients (indicating the problem is primarily on one side).

Step 9. Identify all electrical and mechanical sources that match the Fourier or Wavelet modes in step 7 and 8, along with (a) which side is primarily affected, (b) the magnitude of the variations, and (c) use the heuristics given in table 1 to rank the effects that best match the observed patterns.

Step 10. Perform Fourier and wavelet analysis of the primarily transverse direction variations in the residual signal to look for hydrodynamic effects. This is performed by examining the Fourier and or wavelet coefficients for different Gram polynomial orders. This may be aided by plotting the Fourier and or wavelet coefficients as a function of Gram polynomial order although such a plot is not required. Hydrodynamic effects are identified by having the amplitude of oscillation persist at higher order polynomials in contrast to mechanical effects for which the amplitude of oscillation decreases for higher order polynomials, as shown in Example 1 and comparative Example 2. The sum of squares (to be used as a cost function for optimization) may be computed from the residual array or from an optimally de-noised representation of the effects.

Step 11. Report the sum of squares for hydrodynamic effects as well as the sum of squares for the unassigned variation and the measurement noise estimate.

It is contemplated the process includes method for diagnosing the source of subtle variations in the properties of the planar material 10 moving in a machine direction along a manufacturing line having a plurality of machine components each of which may have a corresponding periodic frequency (or period), the planar material having a longitudinal direction extending along the machine direction and transverse direction perpendicular to the longitudinal direction, the method including:

(a) Obtaining a dataset comprising values of the property of interest taken at an array of points extending over the machine direction and transverse direction of the planar material 10 taken along the transverse direction at a series of longitudinal locations on the planar material wherein a distance between subsequent longitudinal locations is less than one half a travel distance of the planar material in one cycle of a highest frequency machine component 20;

(b) Statistically breaking the measured variations into a linear sum of components attributable to various mechanical and fluid mechanical causes grouped by the nature of variation in the machine direction:

(i) Those variations that show no variation in the machine direction are defined as the standing transverse direction variation and are estimated by taking the average of many transverse arrays over the machine direction. The standing transverse direction variation is further broken into two classes: variations that exhibit an oscillatory or periodic variations in the transverse direction and variations that do not exhibit oscillatory or periodic variations in the transverse direction. Variation that are not periodic are attributed to imperfections in the machine components 20 that are intended to create a uniform distribution in the property or uniform processing conditions on the line. Standing transverse variations that are periodic in the transverse direction are attributed to fluid mechanical, solid mechanical, plastic, or viscoelastic instabilities (effects) in the processing of the planar material.

(ii) Those variations that show oscillatory behavior in the machine direction are also broken into two classes: variations that correspond to known frequencies of the machine components 20 and variations that do not correspond to the known mechanical frequencies associated with the line including variations that oscillate but are not truly periodic.

(iii) Oscillatory variations that do not correspond to known mechanical frequencies of the machine components of the line are broken into two classes: variations that correspond to measured oscillatory variations in the processing conditions of the line including variations introduced by feedback control systems and variations attributed to fluid mechanical, solid mechanical, plastic, or viscoelastic instabilities (effects) in the processing of the planar material;

(iv) Variations in the machine direction that are not oscillatory are attributed to long term aperiodic variations in the feed material or processing conditions on the line.

(v) Variations in the machine direction that exhibit a frequency or period that corresponds to the known mechanical frequencies of the line are further analyzed to determine the nature of the mechanical defect causing the variation as described in paragraph (c) below; and (c) Identifying a periodic length on the planar material 10 corresponding to the periods of each of the plurality of machine components and estimating, for each component frequency, an average variation at each point in the transverse direction along a series of longitudinal locations occurring during movement of the planar material in the machine direction during one cycle (or period) of the component to create a two dimensional array of the variation at the frequency and analyzing this array to diagnose the imperfections in the machine component that corresponds to that frequency, wherein subtle variations that repeat at a known component frequency are broken down into three classes: (i) subtle variations that manifest themselves as straight lines parallel to the transverse direction are attributed to the machine components that exhibit the frequency of the variation; (ii) subtle variations that manifest themselves as straight lines at an angle to the transverse direction are attributed to the machine components that exhibit variations at that frequency combined with asymmetry of the line; and (iii) subtle variations that manifest themselves as curved lines are attributed to the machine component that exhibits that frequency combined with fluid mechanical, solid mechanical, plastic, or viscoelastic effects in the processing of the planar material.

It is understood the analyzed array can be a subset of the full array of data taken by the sensor, wherein the subset may comprise a further subset of the transverse array taken at lateral points in a subset of the machine direction array provided the subset of machine direction points satisfies the criterion above. Further, the variations in the transverse direction can be replaced by a fit using orthogonal polynomials and the polynomial coefficients are then analyzed for their machine direction variations, rather than analyzing the full transverse direction array. This increases the efficiency of the process and reduces necessary computing power. In one configuration, the orthogonal polynomials are Gram Polynomials. As set forth above, the process can be iterative until the residual variation of the statistical model is less than a noise of a sensor obtaining the dataset. In one configuration, the distance in the longitudinal direction between the first longitudinal position and the second longitudinal position is less than 10 centimeters. Similarly, in one configuration, the distance in the transverse direction between adjacent data points in the first subset of data points in less than 10 centimeters. In one configuration, the distance in the machine direction between each subsequent longitudinal location is less than one quarter the travel distance of the planar material in one cycle of the highest frequency machine component. The method further contemplates providing a table of at least the fundamental period or frequency of each machine component 20. The method can also include providing a table of the periods of the overtones of each machine component 20. In addition, a graphical display of the fit of the effects of any frequency can be generated and displayed, such as but not limited to a monitor or a print display.

In a further configuration, the process encompasses a method of manufacturing a planar material 10 within a nominal operating window in a manufacturing line 40, the planar material passing longitudinally along a machine direction and having a transverse direction transverse to the machine direction, the method including (a) measuring a spatial variation in a property of the planar material along the transverse direction of the web at a first longitudinal location on the web and a second longitudinal location on the web; (b) decomposing the measured spatial variation into an assignable component and a noise component; (c) identifying, from a first predetermined value, a first cause corresponding to a first portion of the assignable component to generate a residual component; and (d) decomposing the residual component to identify, from a second predetermined value, a second cause corresponding to a portion of the residual component.

In addition to characterizing subtle variations in real time, the present system can be used to characterize defects and flaws. In contrast to analyzing subtle variations by "infometric analysis" where large data files are downloaded and analyzed statistically off-line, the present disclosure provides for the analysis of subtle defects in real time, used to generate control charts, and provide diagnostic information that can be used while the manufacturing line is running. It is further contemplated the present system can cooperate with prior defect and flaw detectors, wherein the present system can also be integrated with a supervisory control system, wherein information about the configuration of the manufacturing line 40 can aid in the diagnosis of the manufacturing line.

The present system can be used with any measurement system that can be used to characterize the variations in the planar material 10, wherein the measurement system produces an array of measurements with a spacing of measurements in the machine direction no greater than ten centimeter. In certain configurations, a spacing in the transverse direction (sometimes called the "cross direction") may be greater than the spacing in the machine direction.

EXAMPLES

Some defects appear or disappear suddenly upon small changes in processing conditions; other defects appear gradually as processing conditions are changed. The following examples show defects that are known to appear and disappear gradually; thus, images that show a visible level of these patterns can be used to illustrate the geometry of subtle variations of the same cause and nature as well as the methods described here.

Example 1

Figure 5:
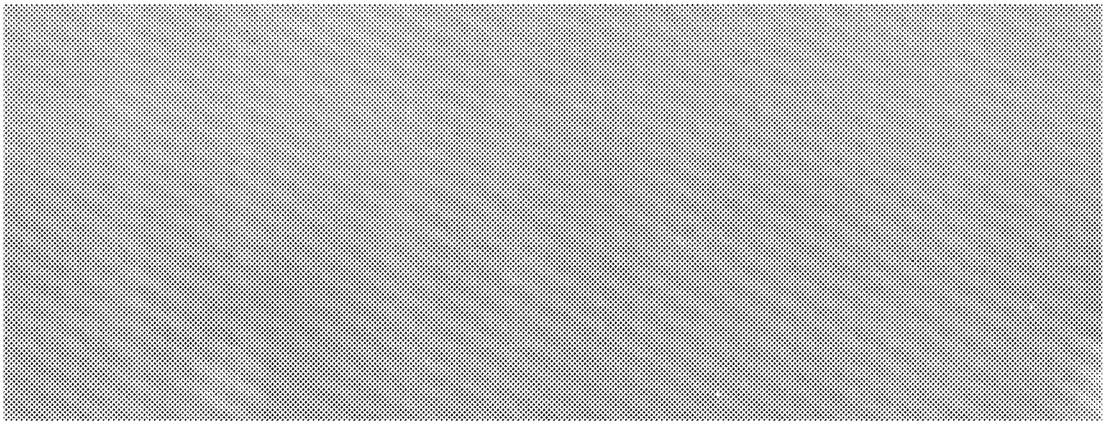
FIG. 5 is a gray scale image of a periodic defect that is at an oblique angle to the machine direction, shown as vertical in FIG. 5, and showing the effects of asymmetry in the machine components of the manufacturing line.

FIG. 4 shows mechanical chatter on a slot die coated film that has been contrast enhanced for the purpose of reproduction. Chatter refers to the effects of fluctuations in the speed at which the planar material 10 is conveyed through the manufacturing line 40 and the amplitude of the disturbance is known to scale with the amplitude of the fluctuations. FIG. 5 shows the asymmetric pattern on a reverse gravure coated film that results from the asymmetric trihelical engraving on the surface of the gravure roll where the gravure ratio is low. Gravure patterns in reverse gravure coating are known to disappear gradually as the gravure ratio is increased and become subtle variations in most commercial applications. FIG. 6 shows a barring defect on a slot die coated film that results from waves propagating on the meniscus of bead coaters at low speeds. The image has been contrast enhanced for the purpose of reproduction. This defect as well as the defect shown in FIG. 7 have been explained and modeled mathematically (see "Advances in computational methods for free surface flow" by Kostas N. Christodoulou, Stephan F. Kistler, and P. Randall Schunk, in *Liquid film coating: Scientific principles and their technological implications*, Stephan F. Kistler and Peter M. Schweitzer Editors, London: Chapman and Hall (1997)) using an eigenvalue/eigenvector approach: the onset of barring and ribbing occurs when the real part of one eigenvalue of the system becomes positive; however as the negative real part of the eigenvalue approaches zero, the sensitivity of the system to its associated eigenvector increases leading to subtle variations. Because the eigenvector does not vary as the real part of the eigenvalue changes sign, the shape of the subtle variations is the same as the shape of the defects shown in the figures.

Example 2

Figure 9:
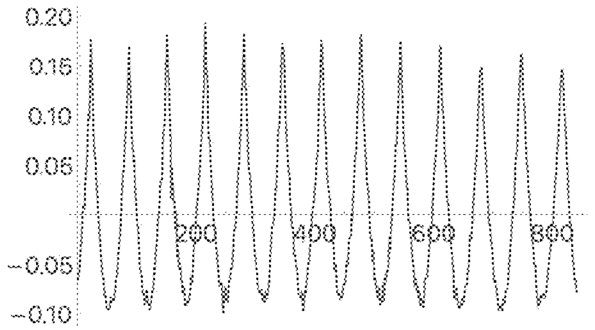
FIG. 9 is a plot of the residual variation versus array index for the array shown in FIG. 8 after the second order Gram polynomial baseline has been subtracted.
Figure 10:
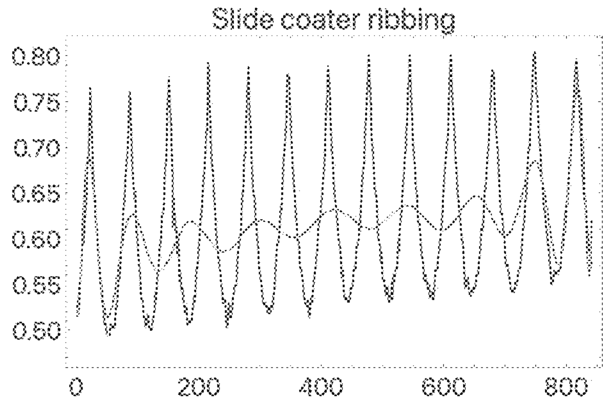
FIG. 10 is a plot of the same gray scale array shown in FIG. 8 showing a twentieth order Gram polynomial baseline correction.
Figure 11:
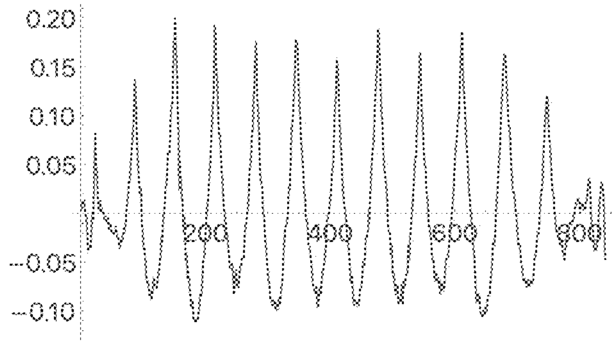
FIG. 11 is a plot of the residual variation versus array index for the array shown in FIGS. 8 and 10 after a twentieth order Gram polynomial baseline has been subtracted.

Slide coating is well known to exhibit ribbing. FIG. 7 shows a gray scale rendition of ribbing produced by a slide coater. When fitting transverse direction features such as ribbing, the basis functions for the orthogonal polynomial fitting and the wavelet analysis are not strictly orthogonal so the decomposition into orthogonal polynomials and oscillatory functions depends on the order of polynomial fitting. This dependence can be minimized by truncating the initial transverse direction screening at a low polynomial order so that the initial fitting has minimum effect on the oscillatory fit. FIG. 8 shows a transverse direction array of gray scale values taken at the center of FIG. 7 versus array index along with a second order Gram polynomial fit to the array. FIG. 9 shows the residual variation left when this second order fit is subtracted from the array shown in FIG. 5. This residual can be fit using the Discrete Wavelet Transform using many wavelets including but not limited to Daubechies wavelets.

Comparative Example 1

If the order of the orthogonal polynomial fit to the base line is too high, the orthogonal polynomial may fit part of the oscillatory behavior. FIG. 6 shows the same transvers array of gray scales as FIG. 5 with a twentieth order Gram polynomial used for the baseline and FIG. 7 shows the corresponding residual after the twentieth order baseline has been subtracted. Although FIG. 7 may also be fit with Daubechies wavelets, the higher order baseline has masked part of the subtle variation caused by this hydrodynamic effect.

This disclosure has been described in detail with particular reference to an embodiment, but it will be understood that variations and modifications can be effected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A method for diagnosing a source of subtle variations in a property of a planar material, the method comprising:

(a) moving the planar material in a machine direction along a manufacturing line having a plurality of machine components, at least a subset of the plurality of machine components having a known corresponding periodic frequency, or period, the planar material having a longitudinal direction extending along the machine direction and a transverse direction perpendicular to the longitudinal direction;

(b) obtaining from a sensor a dataset, the dataset comprising values of the property in an array of points extending along the machine direction and the transverse direction of the planar material, wherein the points taken along the transverse direction are at a series of longitudinal locations on the planar material, and wherein a distance between subsequent longitudinal locations is less than one half a travel distance of the planar material in one cycle of a machine component of the subset of the plurality of machine components having a highest periodic frequency;

(c) measuring variations in the dataset and statistically decomposing the measured variations into a linear sum of components attributable to at least one of a predetermined mechanical cause and a predetermined fluid mechanical cause that are categorized into at least one of a plurality of groups:

wherein a first group of the plurality of groups comprise a standing transverse direction variation, which include variations having no change in the machine direction that are estimated by taking an average of a multitude of transverse arrays along the machine direction, wherein the standing transverse direction variation is decomposed into one of (i) a periodic variation in the transverse direction and (ii) a non-periodic variation in the transverse direction, wherein the non-periodic variation in the transverse direction is attributed to an imperfection in a machine component and the periodic variation in the transverse direction is attributed to at least one of a fluid mechanical, a solid mechanical, a plastic, or a viscoelastic instability in the planar material;

wherein a second group of the plurality of groups comprise oscillatory variations in the machine direction, which are decomposed into one of (i) periodic variations corresponding to a known frequency of a machine component, (ii) periodic variations independent of known frequencies of machine components, (iii) oscillatory but not truly periodic variations and (iv) variations associated with a feed stock, wherein the periodic variations at a known frequency are attributed to machine components associated with that frequency and the periodic variations independent of known frequencies are decomposed into one of (i) variations corresponding to a measured process variation, (ii) variations in the feedstock, (iii) non-periodic oscillatory variations attributed to non-periodic limit cycles in processing conditions and (iv) variations attributed to the fluid mechanical, the solid mechanical, the plastic, or the viscoelastic instability in the planar material;

wherein a third group of the plurality of groups comprise non-oscillatory variations in the machine direction, which are attributed to a long term aperiodic variation in one of a feed material and a processing condition on the manufacturing line;

(d) determining that the subset of the plurality of machine components exhibit oscillatory variations in the machine direction having periodic variations corresponding to the known frequencies of the subset, and determining a nature of a mechanical defect for the exhibited oscillatory variations by identifying a periodic length on the planar material corresponding to a period of each machine component in the subset and estimating, for each machine component in the subset, an average variation at each point in the transverse direction along a series of longitudinal locations occurring during movement of the planar material in the machine direction during one cycle, or period, of the machine component to create a two dimensional array of the variation at the machine component known frequency of the machine component, and diagnosing imperfections in the machine component corresponding to the known frequency of the machine component, wherein the exhibited oscillatory variations repeating at a known component frequency are decomposed into one of (i) variations manifesting as straight lines perpendicular to the machine direction and are attributed to machine components that exhibit a frequency of the variation; (ii) subtle variations manifesting as straight lines at an angle to the transverse direction and are attributed to machine components that exhibit variations at that frequency combined with asymmetry of the line; and (iii) subtle variations manifesting as curved lines and are attributed to a machine component that exhibits that frequency combined with at least one of the fluid mechanical, the solid mechanical, the plastic, or the viscoelastic effects in the planar material;

(e) obtaining a residual variation based on the estimated average variation for at least one machine component in the subset; and (f) when the residual variation exceeds an acceptable level, perform a corrective action in the manufacturing line given the nature of the mechanical defect.

2. The method of claim 1, wherein the two dimensional array is a subset of a full array of data taken by the sensor, wherein the two dimensional array comprises a subset of a respective transverse array of the multitude of transverse arrays taken at lateral points in a subset of a machine direction array.

3. The method of claim 2, further comprising replacing the standing transverse direction variations in the transverse direction with a fit using orthogonal polynomials having polynomial coefficients, and analyzing the polynomial coefficients for machine direction variations.

4. The method of claim 3, wherein the orthogonal polynomials are Gram Polynomials.

5. The method of claim 4, further comprising iterating step (c) until a residual variation is less than a noise of the sensor.

6. The method of claim 3, further providing a graphical display of the fit.

7. The method of claim 1, wherein a distance in the longitudinal direction between the subsequent longitudinal locations is less than 10 centimeters.

8. The method of claim 1, wherein a distance in the transverse direction between adjacent data points is less than 10 centimeters.

9. The method of claim 1, wherein a distance in the machine direction between each subsequent longitudinal location is less than one quarter the travel distance of the planar material in one cycle of the highest frequency machine component.

10. The method of claim 1, further comprising providing a table of at least a fundamental period or frequency of each machine component.

11. The method of claim 10, further comprising providing a table of periods of the overtones of each machine component.

12. A method for diagnosing subtle variations in a planar material, the method comprising:

(a) moving the planar material in a machine direction along a manufacturing line having a plurality of machine components, each machine component having a corresponding revolution frequency, or period, the planar material having a longitudinal direction extending along the machine direction and transverse direction perpendicular to the longitudinal direction;

(b) obtaining a dataset including a first subset of transversely spaced data points from the planar material taken along the transverse direction at a first longitudinal location on the planar material and a second subset of transversely spaced data points taken along the transverse direction at a second longitudinal location on the planar material, wherein a distance between the first longitudinal location and the second longitudinal location is less than one half a travel distance of the planar material in one cycle of a machine component of the plurality of machine components having a highest frequency of revolution;

(c) identifying a periodic length on the planar material corresponding to each of the plurality of machine components;

(d) estimating, for each machine component, an average variation at each point in the transverse direction along a series of longitudinal locations occurring during movement of the planar material in the machine direction during one cycle of the machine component;

(e) comparing the estimated average variation for at least one machine component to a corresponding variation in the dataset to obtain a residual variation; (f)

(f) fitting an additional frequency, or period, to the residual variation to identify a source of the residual variation, and (g) when the residual variation exceeds an acceptable level, perform a corrective action in the manufacturing line based on the identified source of the residual variation.

13. The method of claim 12, further comprising iterating steps (d) and (e) until no further effects can be found that are statistically significantly different from the noise of a sensor obtaining the dataset.

14. The method of claim 12, wherein the residual variation corresponds to:

$$\psi_r(x, t \mid k) = \left(\psi(x, t) - \psi^0(x, t)\right) - \psi_{Standing}(x) - \sum_{j=1}^{k} \widetilde{\psi_j(x, t)}$$

where k represents previously characterized layers of the planar material, $\psi(x,t)$ is an actual measured value of $\psi$ at a specific position x and time t, $\psi^0(x,t)$ is a target value of $\psi$ at a point corresponding to position x and a machine direction position that will be measured at time t, $(\psi(x,t)-\psi^0(x,t)$ represents a total deviation of a pattern of the planar material, $\psi_{standing}(x)$ is a standing variation corresponding to a time average of all data at position x, and $$\sum_{j=1}^{k} \widetilde{\psi_j(x, t)}$$

represents a sum of known variations from previously layers that provides an approximation of the pattern of the planar material.

15. The method of claim 12, wherein comparing the estimated average includes comparing the estimated average for each machine component.

16. The method of claim 12, wherein the distance in the longitudinal direction between the first longitudinal position and the second longitudinal position is less than 10 centimeters.

17. The method of claim 12, wherein a distance in the transverse direction between adjacent data points in the first subset of data points in less than 10 centimeters.

18. The method of claim 12, wherein the distance in the longitudinal direction between the first longitudinal location and the second longitudinal location is less than one quarter the travel distance of the planar material in one cycle of the highest frequency machine component.

19. The method of claim 12, further comprising providing a table of at least one of a period or frequency of each machine component.

20. An apparatus for diagnosing subtle variations in a planar material, the apparatus comprising:

(a) a manufacturing line having a plurality of machine components and configured to move the planar material in a machine direction, each machine component having a corresponding revolution frequency, or period, the planar material having a longitudinal axis extending along the machine direction and transverse axis perpendicular to the longitudinal axis;

(b) a memory storing a dataset having a first subset of transversely spaced data points from the planar material taken along the transverse axis at a first longitudinal location on the planar material and a second subset of transversely spaced data points taken along the transverse direction axis at a second longitudinal location on the planar material, wherein a distance between the first longitudinal location and the second longitudinal location is less than one half a travel distance of the planar material in an amount of time a machine component of the plurality of machine components having a highest frequency of revolution needs to complete one revolution and is less than 10 centimeters; and (c) a controller configured to analyze the dataset, the controller configured to (i) identify a periodic length on the planar material corresponding to each of the plurality of machine components;

(ii) estimate, for each machine component, an average variation at each point in the transverse axis along a series of longitudinal locations occurring during movement of the planar material in the machine direction during one cycle of the machine component, (iii) compare the estimated average variation for at least one machine component to a corresponding variation in the dataset to obtain a residual variation; (iv) fit an additional frequency, or period, to the residual variation to identify a source of the residual variation; and (v) when the residual variation exceeds an acceptable level, perform a corrective action in the manufacturing line given the identified source of the residual variation.

* * * * *